(12) United States Patent
Suk et al.

(10) Patent No.: US 12,469,176 B2
(45) Date of Patent: Nov. 11, 2025

(54) METHOD AND SYSTEM FOR VISUALIZING DYED HAIR IMAGE

(71) Applicants: Korea Advanced Institute of Science and Technology, Daejeon (KR); AMOREPACIFIC CORPORATION, Seoul (KR)

(72) Inventors: Hyeon-Jeong Suk, Daejeon (KR); Boram Kim, Daejeon (KR); Chul Min Kim, Daejeon (KR); Hyun Choi, Seoul (KR); Moonha Kim, Seoul (KR); Jihye Hyoung, Seoul (KR); Hwaseon Lee, Seoul (KR)

(73) Assignees: Korea Advanced Institute of Science and Technology, Daejeon (KR); AMOREPACIFIC CORPORATION, Seoul (KR)

( * ) Notice: Subject to any disclaimer, the term of this patent is extended or adjusted under 35 U.S.C. 154(b) by 341 days.

(21) Appl. No.: 18/180,659

(22) Filed: Mar. 8, 2023

(65) Prior Publication Data
US 2023/0290005 A1      Sep. 14, 2023

(30) Foreign Application Priority Data
Mar. 14, 2022   (KR) .................... 10-2022-0031263

(51) Int. Cl.
*G06T 7/90* (2017.01)
*G06T 7/10* (2017.01)

(52) U.S. Cl.
CPC ................. *G06T 7/90* (2017.01); *G06T 7/10* (2017.01); *G06T 2207/20221* (2013.01); *G06T 2207/30196* (2013.01)

(58) Field of Classification Search
CPC .......... G06T 5/77; G06T 2207/10024; G06T 2207/20221; G06T 2207/30196; G06T 11/00; G06T 11/001; G06T 11/60; G06T 7/10; G06T 7/90; G06Q 30/0643
See application file for complete search history.

(56) References Cited

U.S. PATENT DOCUMENTS

| | | | | |
|---|---|---|---|---|
| 11,348,334 B1* | 5/2022 | MacEwen | ............ | G06V 10/426 |
| 2005/0264658 A1* | 12/2005 | Ray | ...................... | G06V 40/161 |
| | | | | 348/207.99 |
| 2007/0252831 A1* | 11/2007 | Lind | ....................... | G06T 11/60 |
| | | | | 345/419 |
| 2011/0293188 A1* | 12/2011 | Zhang | ................... | G06V 10/56 |
| | | | | 382/190 |

(Continued)

FOREIGN PATENT DOCUMENTS

KR    10-1488491    2/2015

*Primary Examiner* — Sean T Motsinger
(74) *Attorney, Agent, or Firm* — Heslin Rothenberg Farley & Mesiti P.C.

(57) ABSTRACT

Disclosed are a method and system for visualizing a dyed hair image. The method of visualizing dyeing hair includes separating a hair area from an image related to a dyeing target, detecting a color characteristic of the hair area, determining a target color corresponding to the color characteristic by using a dataset comprising color difference values of dyeing hair using a hairdye product, performing a color transfer using the target color on the hair area, and merging the hair area on which the color transfer using the target color as been performed with the image.

13 Claims, 7 Drawing Sheets

(56) References Cited

U.S. PATENT DOCUMENTS

| | | | |
|---|---|---|---|
| 2011/0299776 A1* | 12/2011 | Lee | G06V 40/171 |
| | | | 382/173 |
| 2014/0118521 A1* | 5/2014 | Conti | G01J 3/0264 |
| | | | 348/E7.085 |
| 2017/0206678 A1* | 7/2017 | Kowalczyk | H04N 1/6027 |
| 2017/0270679 A1* | 9/2017 | Koven | H04N 17/002 |
| 2018/0080865 A1* | 3/2018 | Godfrey | G06F 18/22 |
| 2020/0193503 A1* | 6/2020 | Mathiaszyk | G06Q 30/0623 |
| 2020/0334868 A1* | 10/2020 | Zilly Claude | A45D 44/005 |
| 2021/0124919 A1* | 4/2021 | Balakrishnan | B42D 25/309 |
| 2022/0335252 A1* | 10/2022 | Georgievskaya | G06N 3/088 |
| 2023/0260166 A1* | 8/2023 | Bojan | G06V 10/225 |
| | | | 382/103 |
| 2023/0290005 A1* | 9/2023 | Suk | G06T 7/10 |

* cited by examiner

| Level | Reference color |
|---|---|
| Natural hair | Olive |
| Primary bleached hair | Olive |
| Secondary bleached hair | Turquoise |
| White hair | Viridian |

METHOD AND SYSTEM FOR VISUALIZING DYED HAIR IMAGE

CROSS-REFERENCES TO RELATED APPLICATIONS

This application is based on and claims priority under 35 U.S.C. § 119 to Korean Patent Application No. 10-2022-0031263, filed on Mar. 14, 2022, with the Korean Intellectual Property Office, the disclosures of which are herein incorporated by reference in their entireties.

TECHNICAL FIELD

The following description relates to a technology for providing the results of the prediction of hair dyeing.

BACKGROUND OF THE DISCLOSURE

Methods of photographing a face of a user and merging a virtual hairstyle with the face are presented as one of fields in which image editing is commercially used.

For example, Korean Patent No. 10-1488491 (registered on Jan. 26, 2015) discloses a technology for virtually providing a customer-tailed hairstyle that has not been stored in a hairstyle database by additionally partially processing a hairstyle that has been stored in the hairstyle database.

In particular, research of a virtual hair dyeing technology for providing dyeing results by virtually dyeing hair in a face image is actively carried out.

As one of virtual dyeing algorithms, a virtual dyeing algorithm may be implemented as an image mapping scheme for extracting a part of an image, separating the extracted part, and generating a new image by merging some of the separated parts with another image.

Dyeing is greatly different in the brightness and color of dyed results depending on a hair state of a user, in particular, melanin pigment content although the same hairdye is used. In other words, although the same hairdye is used, dyeing results are greatly different depending on current brightness of hair, that is, a dyeing target.

As the self-dyeing market significantly grows, there are the increasing needs of an amateur who wants to easily predict a color change after dyeing.

However, a current digital solution is based on a photo image and is insufficient to consider a current hair state of a user, and is attempted to provide differentiation simply through the adjustment of transparency or has limited customer communications, such as providing simulations without considering a difference in the hair of each person.

Accordingly, a user cannot accurately know dyeing results. This makes it difficult for smartphone-based virtual simulations to be led to a purchase and becomes an obstacle to the growth of the self-hairdye market.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment provides a method of constructing, as a database, unique functions for each product based on a condition table obtained by checking the results of actual dyeing for each bleaching step of hair, estimating a current hair state that is extracted from a photo image including a face, calculating the results of prediction according to a function constructed in the database, and reproducing a hair color within the image by using the calculated results as a target color.

In an embodiment, there is provided a method of visualizing dyeing hair, which is performed in a computer device, wherein the computer device includes at least one processor configured to execute computer-readable instructions included in memory. The method of visualizing dyeing hair includes separating, by the at least one processor, a hair area from an image related to a dyeing target, detecting, by the at least one processor, a color characteristic of the hair area, determining, by the at least one processor, a target color corresponding to the color characteristic by using a dataset including color difference values of dyeing hair using a hairdye product, performing, by the at least one processor, a color transfer using the target color on the hair area, and merging, by the at least one processor, the hair area on which the color transfer using the target color as been performed with the image.

According to an aspect, separating the hair area may include applying white balancing to the image, and cutting, as an image based on a face area, the image to which the white balancing has been applied.

According to another aspect, separating the hair area may include separating the hair area from the image along with a face skin area through image segmentation.

According to still another aspect, detecting the color characteristic may include calculating a brightness level and undertone level of a hair color based on a distribution of lab color values of pixels that constitute the hair area.

According to still another aspect, the dataset may include color values obtained by making colorimetric results of hair, which has been dyed using the hairdye product in each step, by using a spectrophotometer after dividing initial hair brightness for each step. Determining the target color may include determining the target color that corresponds to the color characteristic and that has been predicted based on the results of the dyeing by using the dataset through linear interpolation.

According to still another aspect, the dataset may include predefined reference colors as results of hair, which has been dyed using the hairdye product in each step, after dividing initial hair brightness for each step. Determining the target color may include determining, as the target color, a reference color predefined in initial hair brightness in a step that is most similar to the color characteristic by using the dataset.

According to still another aspect, detecting the color characteristic may include extracting a brightness level and undertone level of a hair color based on a color value of pixels that constitute the hair area. Performing the color transfer may include performing the color transfer for transferring a representative color to the target color by considering the brightness level and the undertone level as a representative color, wherein a distribution of pixels brightness deviations is modified based on brightness of the target color.

According to still another aspect, merging the hair area may include merging, with the image, an edge area of the hair area on which the color transfer using the target color has been performed, after assigning transparency to the edge area.

According to still another aspect, the method may further include, by the at least one processor, extracting a skin color based on a color value of pixels that constitute a face skin area separated from the image. Merging the hair area may include merging the hair area on which the color transfer using the target color has been performed, with an area in which a color difference with the skin color is at least a predetermined level in the image.

In an embodiment, there is provided a computer program which is stored in a computer-readable recording medium in order to execute a method of visualizing dyeing hair in a computer. The method of visualizing dyeing hair may include separating a hair area from an image related to a dyeing target, detecting a color characteristic of the hair area, determining a target color corresponding to the color characteristic by using a dataset including color difference values of dyeing hair using a hairdye product, performing a color transfer using the target color on the hair area, and merging the hair area on which the color transfer using the target color as been performed with the image.

In an embodiment, there is provided a system for visualizing dyeing hair, which is implemented as a computer, including at least one processor configured to execute computer-readable instructions included in memory. The at least one processor is configured to separate a hair area from an image related to a dyeing target, detect a color characteristic of the hair area, determine a target color corresponding to the color characteristic by using a dataset including color difference values of dyeing hair using a hairdye product, perform a color transfer using the target color on the hair area, and merge the hair area on which the color transfer using the target color as been performed with the image.

According to embodiments of the present disclosure, results after dyeing can be predicted with high accuracy by checking the step of current hair by separating a hair portion of a photo image and using, as a reference, a monitoring value that differently indicates dyeing results depending on brightness and a tone step of hair, that is, a dyeing target, for each hairdye.

According to embodiments of the present disclosure, a service into which the needs of a (self-dyeing) customer who autonomously dyes his or her hair without the help of an expert are incorporated can be provided by presenting simulations into which an actual phenomenon in which different dyeing results are derived although the same hairdye is used has been incorporated based on a hair state of a dyeing target.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 4 illustrates an example of a color look-up table of hairdye products in an embodiment of the present disclosure.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to a technology for visualizing and providing the results of the prediction of hair dyeing.

Embodiments including contents that are specifically disclosed in this specification may provide the results of more accurate prediction of hair dyeing by using, in image rendering, a result color value of hair to which a hairdye has been actually applied based on brightness of a hair value in order to implement a targeted hair color.

Figure 1:
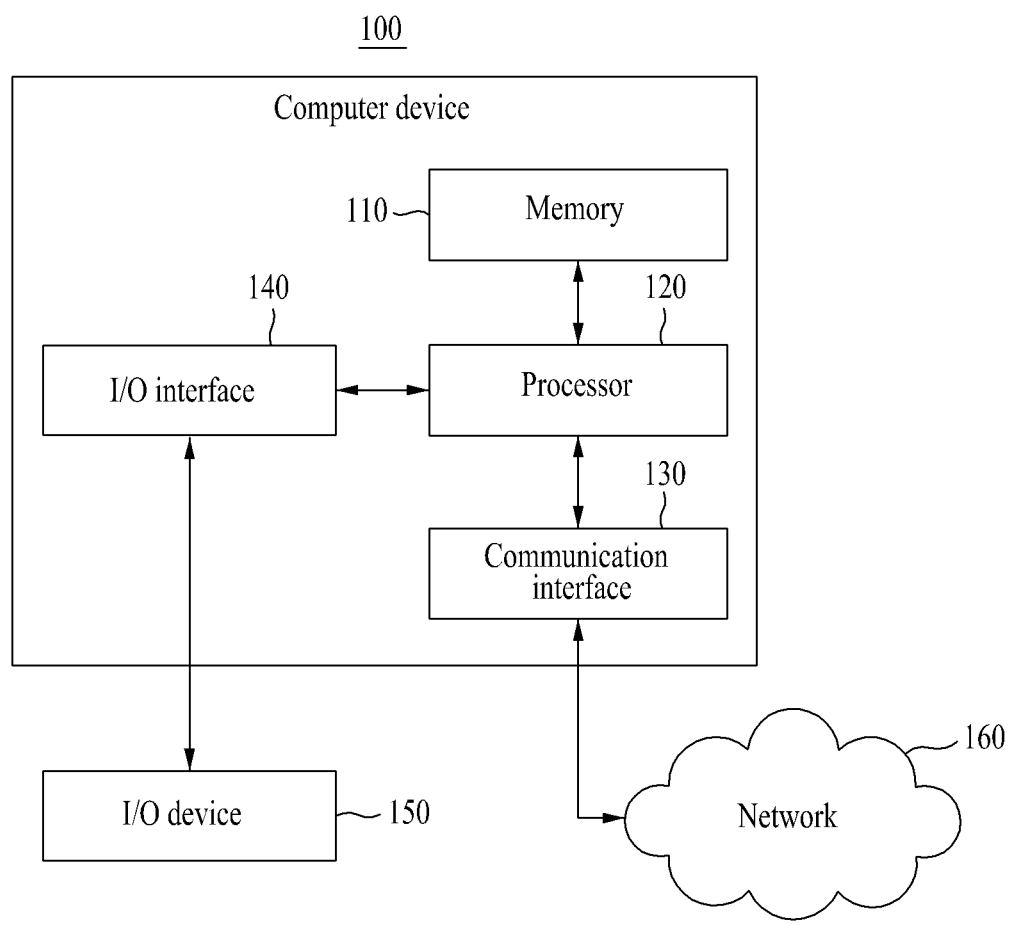
FIG. 1 is a block diagram for describing an example of internal components of a computer device in an embodiment of the present disclosure.

FIG. 1 is a block diagram illustrating an example of a computer device according to an embodiment of the present disclosure. For example, a system for visualizing dyeing hair according to embodiments of the present disclosure may be implemented by a computer device 100 illustrated in FIG. 1.

As illustrated in FIG. 1, the computer device 100 is a component for executing a method of visualizing dyeing hair according to embodiments of the present disclosure, and may include memory 110, a processor 120, a communication interface 130, and an input/output (I/O) interface 140.

The memory 110 is a computer-readable recording medium, and may include permanent mass storage devices, such as random access memory (RAM), read only memory (ROM), and a disk drive. In this case, the permanent mass storage device, such as ROM and a disk drive, may be included in the computer device 100 as a permanent storage device separated from the memory 110. Furthermore, an operating system and at least one program code may be stored in the memory 110. Such software components may be loaded onto the memory 110 from a computer-readable recording medium separated from the memory 110. Such a separate computer-readable recording medium may include computer-readable recording media, such as a floppy drive, a disk, a tape, a DVD/CD-ROM drive, and a memory card. In another embodiment, the software components may be loaded onto the memory 110 through the communication interface 130 not a computer-readable recording medium. For example, the software components may be loaded onto the memory 110 of the computer device 100 based on a computer program that is installed by files received over a network 160.

The processor 120 may be configured to process instructions of a computer program by performing basic arithmetic, logic, and input/output (I/O) operations. The instructions may be provided to the processor 120 by the memory 110 or the communication interface 130. For example, the processor 120 may be configured to execute received instructions based on a program code that has been stored in a recording device, such as the memory 110.

The communication interface 130 may provide a function for enabling the computer device 100 to communicate with other devices over the network 160. For example, a request, an instruction, data, or a file that is generated by the processor 120 of the computer device 100 based on a program code that has been stored in a recording device, such as the memory 110, may be transferred to other devices over the network 160 under the control of the communication interface 130. Inversely, a signal, an instruction, data, or a file from another device may be received by the computer device 100 through the communication interface 130 of the computer device 100 over the network 160. A signal, an instruction, a file that is received through the communication interface 130 may be transmitted to the processor 120 or the memory 110. A file that is received through the communication interface 130 may be stored in a storage medium (e.g., the aforementioned permanent storage device) which may be further included in the computer device 100.

The communication method is not limited, and may include short-distance wired/wireless communication between devices, in addition to communication methods using communication networks (e.g., a mobile communication network, wired Internet, wireless Internet, and a broadcasting network) which may be included in the network 160. For example, the network 160 may include one or more arbitrary networks of a personal area network (PAN), a local area network (LAN), a campus area network (CAN), a metropolitan area network (MAN), a wide area network (WAN), a broadband network (BBN), and the Internet. Furthermore, the network 160 may include one or more of network topologies, including a bus network, a star network, a ring network, a mesh network, a star-bus network, and a tree or hierarchical network, but is not limited thereto.

The I/O interface 140 may be means for an interface with an I/O device 150. For example, the input device may include a device, such as a microphone, a keyboard, a camera, or a mouse. The output device may include a device, such as a display or a speaker. Furthermore, for example, the I/O interface 140 may be means for an interface with a device in which functions for an input and an output have been integrated into one, such as a touch screen. The I/O device 150, together with the computer device 100, may be configured as a single device.

Furthermore, in other embodiments, the computer device 100 may include components greater or smaller than the components of FIG. 1. However, it is not necessary to clearly illustrate most of conventional components. For example, the computer device 100 may be implemented to include at least some of the I/O devices 150 or may further include other components, such as a transceiver, various sensors, and a database.

Hereinafter, detailed embodiments of a method and system for visualizing a dyed hair image are described.

Figure 2:
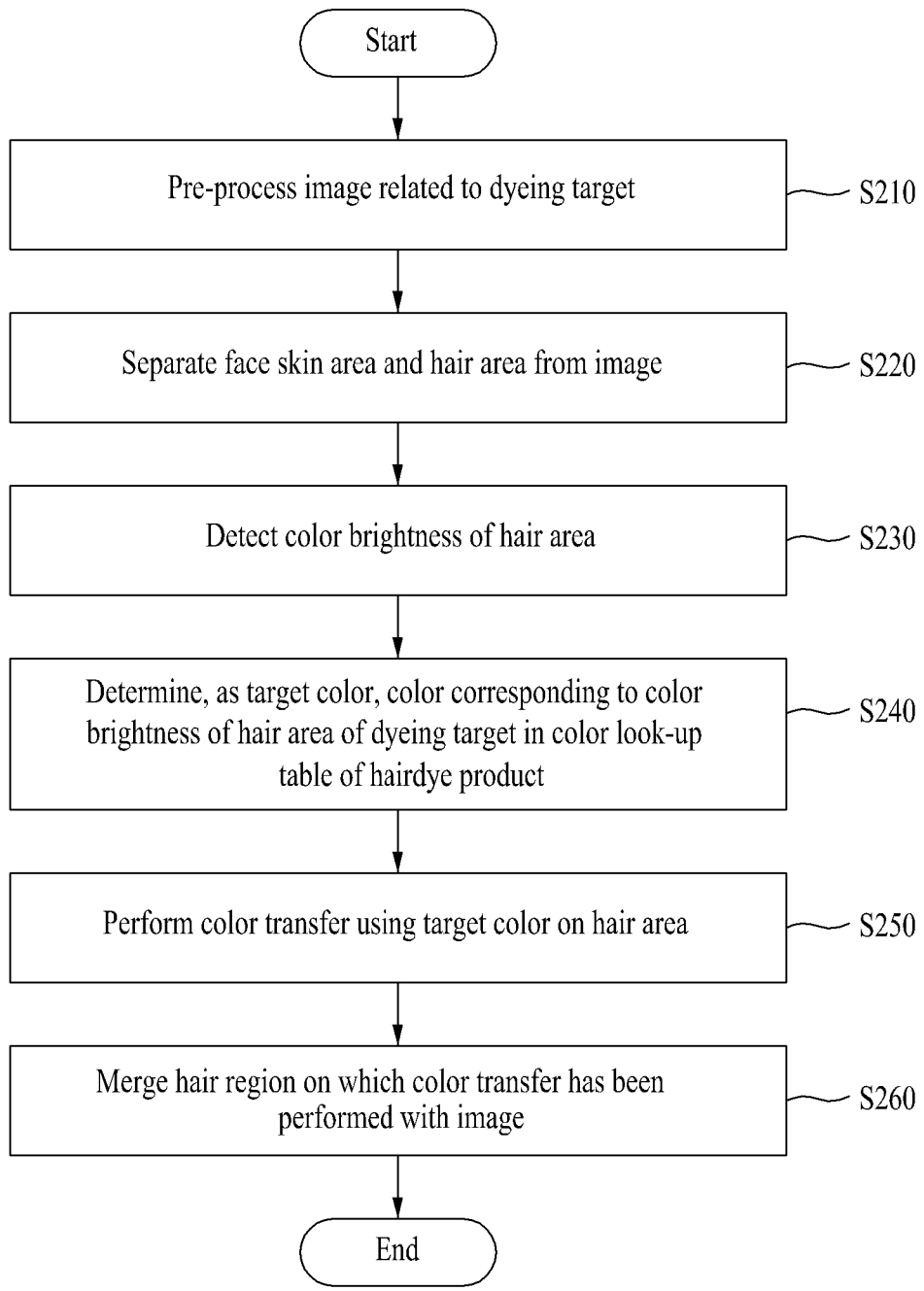
FIG. 2 is a flowchart illustrating an example of a method of visualizing a dyeing hair image in an embodiment of the present disclosure.

FIG. 2 is a flowchart illustrating an example of a method of visualizing a dyeing hair image in an embodiment of the present disclosure.

Referring to FIG. 2, in step S210, the processor 120 may obtain an image including a face, as an image related to a dyeing target, and may pre-process the obtained image. For example, the processor 120 may obtain an image including a photographed hair area of the dyeing target through a camera function or photo invoking function of a dedicated app. A user corresponding to the dyeing target may photograph and provide his or her figure, in order to check the results of virtual dyeing through a dedicated app.

For example, after applying white balancing to the image including the face of the dyeing target, the processor 120 may cut, as a square image based on a face area, the image to which the white balancing has been applied.

If the image related to the dyeing target is plural, the processor 120 may select and use an image in which a facial portion occupies most of its area, as an image that is more advantageous to check hair.

In this case, the processor 120 may apply a deep learning-based white balancing algorithm as an example of a white balancing technology, and may apply Dlib, that is, a deep learning open source, as an example of a face detection technology in order to capture the image.

In step S220, the processor 120 may separate a face skin area and a hair area from the image that has been pre-processed in step S210. After segmenting the image including the face for each portion through image segmentation, the processor 120 may extract the hair area and the face skin area.

For example, the processor 120 may separate the face skin area and the hair area from the image by using an algorithm (e.g., an ResNet or VGGNet model based on a CelebAMask-HQ dataset) that segments the inside of the face, such as hair, skin, ears, eyes, mouth, and nose, and a surrounding area.

Figure 3:
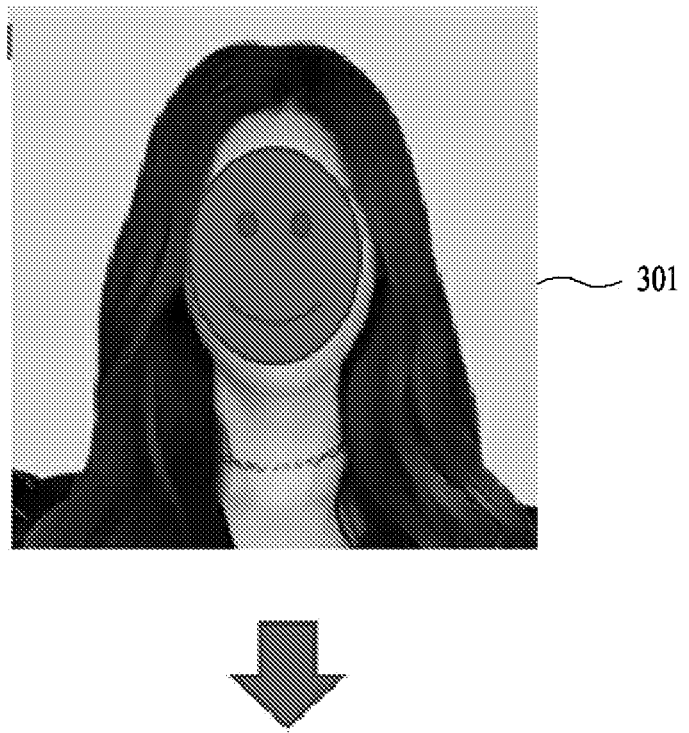
FIG. 3 is an exemplary view for describing a process of separating a hair area from an image in an embodiment of the present disclosure.
Figure 3:
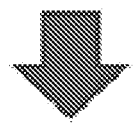
Figure 3:
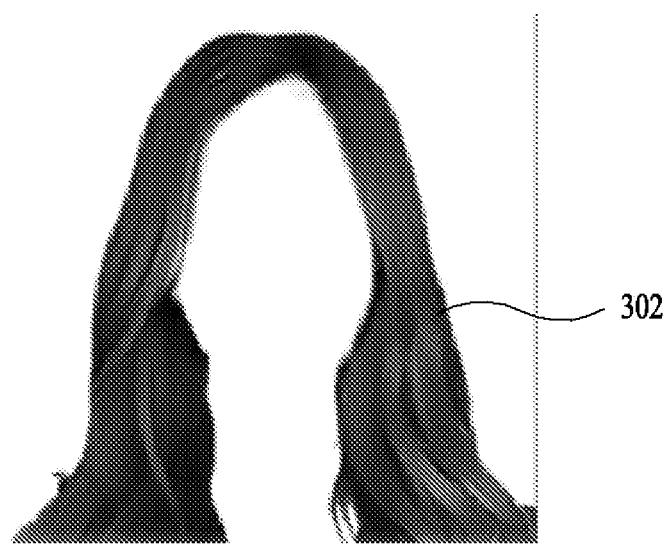

FIG. 3 is an exemplary view for describing a process of separating a hair area from an image in an embodiment of the present disclosure.

As illustrated in FIG. 3, the processor 120 may extract an image 301 that has been cut after white balancing, as an image related to a dyeing target, and a hair area 302 of the dyeing target through segmentation for each portion.

Referring back to FIG. 2, in step S230, the processor 120 may detect color brightness of the hair area that has been separated from the image. The results of dyeing are influenced by orange intensity according to current hair brightness and the Eumelanin and Pheomelanin ratio. Accordingly, the processor 120 may check a brightness level and undertone level of the hair area, indicating representative brightness of the hair color, as a color characteristic of the hair area, based on the image.

For example, the processor 120 may calculate the brightness level and the undertone level based on L (brightness), a (green and red), and b (blue and yellow) distributions of pixels that constitute the hair area obtained in step S220. In this case, the brightness level of the hair may correspond to an 80% point in the L distribution of the pixels, and the undertone level of the hair may correspond to an 50% point in the distribution of the pixels.

Furthermore, the processor 120 may extract a skin color indicative of a representative color of the face skin area that has been separated from the image in order to use the skin color in an image synthesis process S260 below. For example, the processor 120 may use, as the skin color, an average of L, a, and b values of the pixels that constitute the face skin area obtained in step S220.

In step S240, when a hairdye product for virtual dyeing is selected, the processor 120 may determine, as a target color, a prediction color corresponding to color brightness of the hair area of the dyeing target in a color look-up table of the hairdye product.

There is a dataset to which reference is made in defining a hair brightness value. For example, after initial hair brightness is divided into natural hair, primary bleached hair, secondary bleached hair, and white hair, the results of actual dyeing using a hairdye product with respect to an experiment group for each initial hair brightness may become colorimetric by using a spectrophotometer, and may be used as reference data.

The color look-up table is composed for each hairdye product, and may be generated by incorporating a dataset on which color difference values of hair actually dyed by using a hairdye product have been recorded.

FIG. 4 illustrates an example of a color look-up table of hairdye products in an embodiment of the present disclosure.

For example, referring to FIG. 4, reference colors indicative of monitored values of actual dyeing results for each piece of hair brightness level may be predefined in a color look-up table 400 of hairdye products. In other words, the reference colors may be determined based on L, a, and b values that are obtained by making colorimetric the dyeing results of natural hair, primary bleached hair, secondary bleached hair, and white hair for each hairdye product on the basis of a spectrophotometer D65 and a viewing angle of 2 degrees. The spectrum colorimetric method corresponds to a standard method of the chromatic field.

The processor 120 may predict a single color indicative of the dyeing results, that is, the target color, based on a combination of a color characteristic of a hairdye product and a current hair color characteristic of a dyeing target. The processor 120 may determine dyeing results (i.e., the target color) corresponding to the brightness level and undertone level of the dyeing target through linear interpolation by using a dataset of the selected hairdye product.

In an embodiment, after determining the brightness level of hair that is most similar to a current color characteristic of the hair area of the dyeing target in the color look-up table 400 of the hairdye product, the processor 120 may determine, as a target color, a reference color that has been predefined in the brightness level of the hair.

Referring back to FIG. 2, in step S250, the processor 120 may perform a color transfer using the target color on the hair area of the dyeing target. For example, the processor 120 may perform, on pixels that constitute the hair area obtained in step S220, a color transfer using the hair color determined in step S240 as the target color.

The processor 120 may perform a color transfer for transferring a representative color to a target color by considering the brightness level and undertone level of a dyeing target as the representative color. In this case, the processor 120 may incorporate, into the color transfer, a distribution characteristic indicating that a pixel brightness deviation is indicated to be great as the target color becomes bright and the pixel brightness deviation is indicated to be small as the target color becomes dark.

The processor 120 may use a color transfer function that is included in Open CV, in the color transfer using the target color, and may apply a distribution modification method to the pixel brightness deviation.

Figure 5:
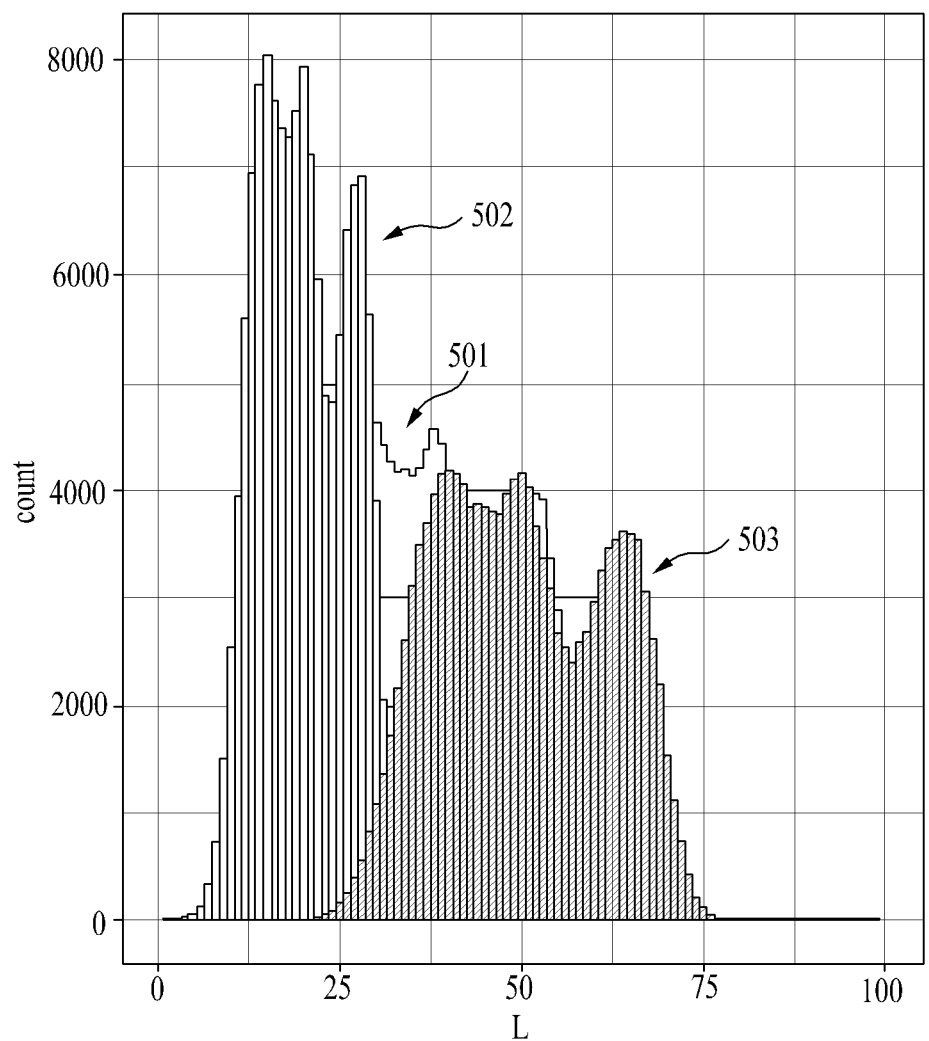
FIG. 5 illustrates an example of a distribution diagram of pixels according to a color transfer in an embodiment of the present disclosure.

Unlike in a common color transfer in which only a center value is moved and variability is applied identically with an original image, in the present disclosure, a variability value may be adjusted in proportion to brightness of a target color in which a center value is moved. In the relation between the brightness of the target color and the variability value, an L value of the target color is applied to the calculation of a standard deviation in the color transfer process. Referring to FIG. 5, if a pixel distribution 501 of original hair is bright dyed (i.e., when a target color is bright), variability is dispersed as in a right histogram 503. When the pixel distribution 501 of the original hair is darkly dyed (i.e., when the target color is dark), variability may be narrowly formed as in a left histogram 502.

Referring back to FIG. 2, in step S260, the processor 120 may merge the hair area on which the color transfer has been completed with the original image, and may provide the merged image as the results of the prediction of hair dyeing.

The processor 120 may generate a dyeing result image by merging an image of the hair area on which the color transfer has been performed with the original image.

The processor 120 may merge, with the image after the white balancing in step S210, edge areas of the image of the hair area on which the color transfer has been performed, after assigning transparency to the edge areas step by step. In this case, the processor 120 may perform image merging on an area in which a color difference of the dyeing target with a skin color in the original image is a predetermined level (e.g., a value between 10 and 30) or higher.

In assigning transparency to the edges of the hair area on which the color transfer has been performed, the processor 120 may use a contour function that is included in Open CV. A color difference condition for the skin color may be determined by a standard operation of the chromatic field.

Figure 6:
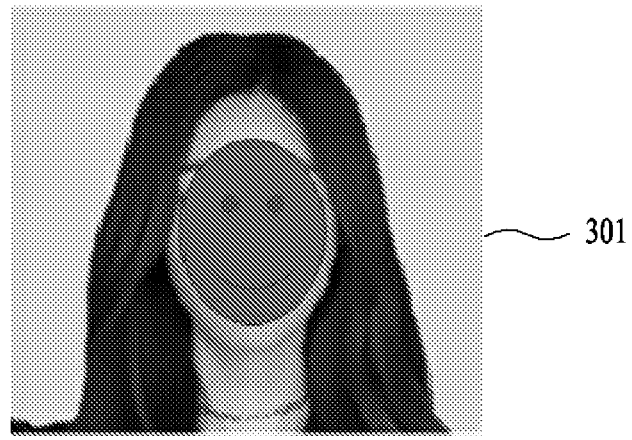
FIGS. 6 to 7 illustrate examples of the results of the prediction of hair dyeing in an embodiment of the present disclosure.
Figure 6:
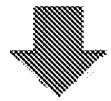
Figure 6:
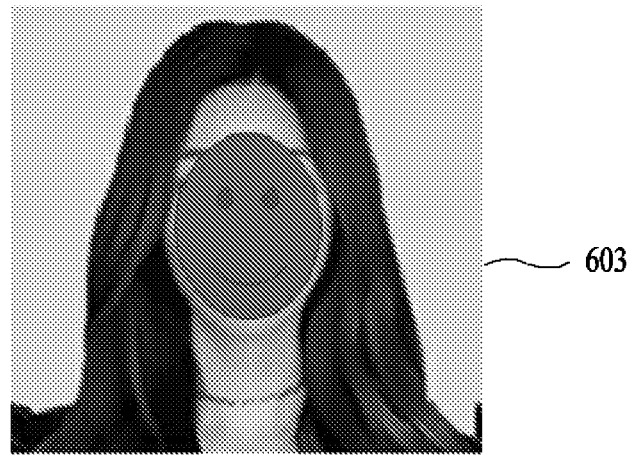
Figure 7:
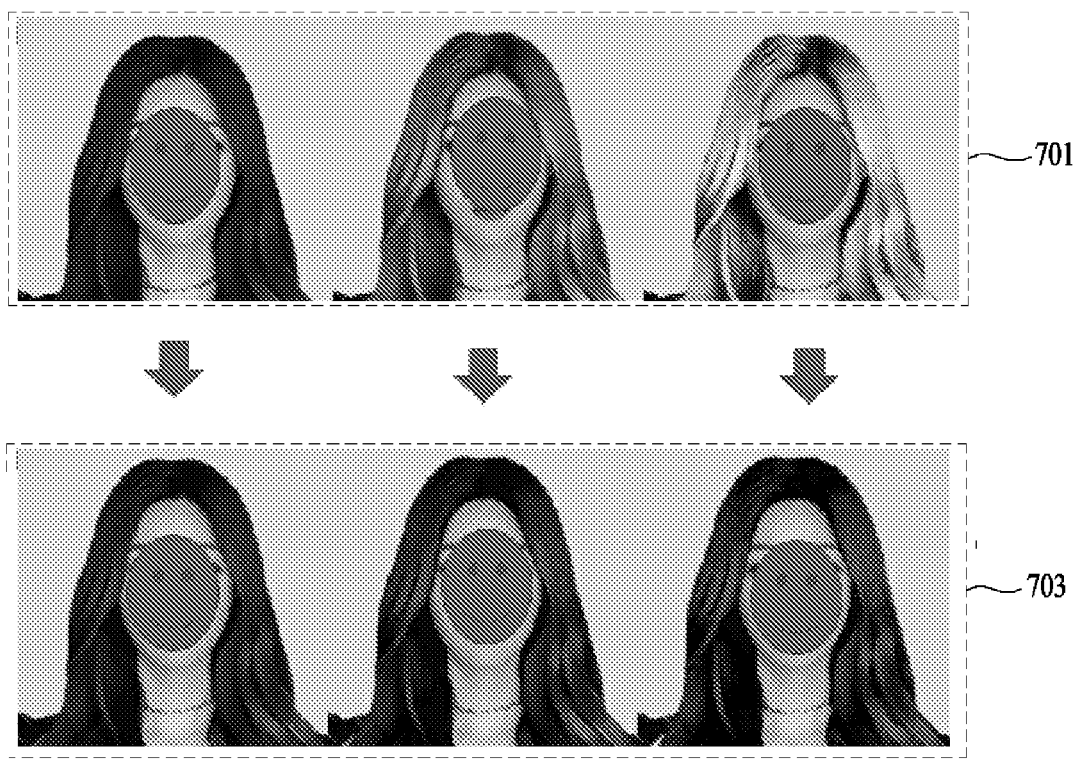

FIGS. 6 to 7 illustrate examples of the results of the prediction of hair dyeing in an embodiment of the present disclosure.

Referring to FIG. 6, the processor 120 may provide a dyeing result image 603 by merging the hair area on which the color transfer has been completed with respect to the target color, with the original image 301 after the white balancing.

The present embodiments may provide different dyeing results, based on a brightness level and undertone level of a dyeing target. As illustrated in FIG. 7, the processor 120 may provide simulations from which different dyeing results 703 are derived, depending on current hair states 701, with respect to the same hairdye product.

In other words, the processor 120 may divide hair brightness into natural hair, primary bleached hair, secondary bleached hair, and white hair, and may secure reference data by making colorimetric the results of actual dyeing for each piece of hair brightness through a spectrophotometer. The processor 120 may check a color characteristic (i.e., a brightness level and an undertone level) of a hair area by separating the hair area from an image including a face, as a service process. In this case, the processor 120 may derive a target color corresponding to a color characteristic of the dyeing target on the basis of reference data, may perform a color transfer from the hair area of the dyeing target into the target color, and may then provide the results of virtual dyeing by merging the results of the color transfer with the original image.

In the present embodiments, a target color for providing the results of virtual dyeing is different depending on a current color characteristic of hair. Such a target color may be incorporated into image rendering for providing the results of the virtual dyeing. In this case, a lab-based brightness and chromaticity conversion equation capable of more clearly incorporating a voice of actually dyed hair may be applied.

As described above, according to embodiments of the present disclosure, a current hair step may be checked by separating a hair portion from a photo image. Results after dyeing can be predicted with high accuracy by using, as a reference, a monitored value having different dyeing results depending on brightness and a tone step of hair, that is, a dyeing target, for each hairdye. Furthermore, according to embodiments of the present disclosure, a service that incorporates the needs of a (self-dyeing) customer who autonomously dyes his or her hair without the help of an expert can be provided by proposing simulations into which an actual phenomenon in which different dyeing results are derived depending on a hair state of a dyeing target although the same hairdye is used has been incorporated.

The aforementioned device may be implemented as a hardware component, a software component, and/or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and ones configured to store a program command, including ROM, RAM, and a flash memory. Furthermore, examples of another medium may include an app store in which apps are distributed, a site in which other various pieces of software are supplied or distributed, and recording media and/or storage media that are managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A method of visualizing dyeing hair, which is performed in a computer device,
   wherein the computer device comprises at least one processor configured to execute computer-readable instructions included in memory, and
   the method of visualizing dyeing hair comprises:
   separating, by the at least one processor, a hair area from an image related to a dyeing target;
   detecting, by the at least one processor, a color characteristic of the hair area;
   determining, by the at least one processor, a target color corresponding to the color characteristic by using a dataset comprising color difference values of dyeing hair using a hairdye product;
   performing, by the at least one processor, a color transfer using the target color on the hair area; and
   merging, by the at least one processor, the hair area on which the color transfer using the target color as been performed with the image,
   wherein:
   detecting the color characteristic comprises extracting a brightness level and undertone level of a hair color based on a color value of pixels that constitute the hair area, and
   performing the color transfer comprises performing the color transfer for transferring a representative color to the target color by considering the brightness level and the undertone level as a representative color, wherein a distribution of pixels brightness deviations is modified based on a brightness of the target color.

2. The method of claim 1, wherein separating the hair area comprises:
   applying white balancing to the image; and
   cutting, as an image based on a face area, the image to which the white balancing has been applied.

3. The method of claim 1, wherein separating the hair area comprises separating the hair area from the image along with a face skin area through image segmentation.

4. The method of claim 1, wherein detecting the color characteristic comprises calculating a brightness level and undertone level of a hair color based on a distribution of lab color values of pixels that constitute the hair area.

5. The method of claim 1, wherein:
   the dataset comprises color values of reference hair measured by a spectophotometer after the reference hair, categorized by each of initial hair brightness levels, was dyed using the hair dye product, and
   determining the target color comprises determining the target color that corresponds to the color characteristic and that has been predicted based on the results of the dyeing by using the dataset through linear interpolation.

6. The method of claim 1, wherein:
   the dataset comprises predefined reference color values of reference hair corresponding to dying results after the reference hair, categorized by each of initial hair brightness levels, was dyed using the hair dye products, and
   determining the target color comprises determining, as the target color, a reference color value among the predefined reference color values most similar to the color characteristic by using the dataset.

7. The method of claim 1, wherein merging the hair area comprises merging, with the image, an edge area of the hair area on which the color transfer using the target color has been performed, after assigning transparency to the edge area.

8. The method of claim 1, further comprising, by the at least one processor, extracting a skin color based on a color value of pixels that constitute a face skin area separated from the image,
wherein merging the hair area comprises merging the hair area on which the color transfer using the target color has been performed, with an area in which a color difference with the skin color is at least a predetermined level in the image.

9. A computer program which is stored in a computer-readable recording medium in order to execute a method of visualizing dyeing hair in a computer,
wherein the method of visualizing dyeing hair comprises:
separating a hair area from an image related to a dyeing target;
detecting a color characteristic of the hair area;
determining a target color corresponding to the color characteristic by using a dataset comprising color difference values of dyeing hair using a hairdye product;
performing a color transfer using the target color on the hair area; and
merging the hair area on which the color transfer using the target color as been performed with the image,
wherein,
the dataset comprises predefined reference color values of reference hair corresponding to dying results after the reference hair, categorized by each of initial hair brightness levels, was dyed using the hair dye product, and
determining the target color comprises determining, as the target color, a reference color value among the predefined reference color values most similar to the color characteristic by using the dataset.

10. A system for visualizing dyeing hair, which is implemented as a computer, the system comprising:
at least one processor configured to execute computer-readable instructions included in memory,
the at least one processor is configured to:
separate a hair area from an image related to a dyeing target,
detect a color characteristic of the hair area,
determine a target color corresponding to the color characteristic by using a dataset comprising color difference values of dyeing hair using a hairdye product,
perform a color transfer using the target color on the hair area, and
merge the hair area on which the color transfer using the target color as been performed with the image,
wherein,
the dataset comprises color values of reference hair measured by a spectrophotometer after the reference hair, categorized by each of initial hair brightness levels, was dyed using the hair dye product, and
the at least one processor is configured to determine the target color that corresponds to the color characteristic and that has been predicted based on the results of the dyeing by using the dataset through linear interpolation.

11. The system of claim 10, wherein the at least one processor is configured to calculate a brightness level and undertone level of a hair color based on a distribution of lab color values of pixels that constitute the hair area.

12. The system of claim 10, wherein the at least one processor is configured to merge, with the image, an edge area of the hair area on which the color transfer using the target color has been performed, after assigning transparency to the edge area.

13. The system of claim 10, wherein the at least one processor is configured to:
extract a skin color based on a color value of pixels that constitute a face skin area separated from the image, and
merge the hair area on which the color transfer using the target color has been performed, with an area in which a color difference with the skin color is at least a predetermined level in the image.

* * * * *